April 5, 1966  G. MARKUS  3,244,578
ORNAMENTAL SHEET MATERIAL AND THE METHOD
OF ITS MANUFACTURE
Filed Jan. 28, 1963
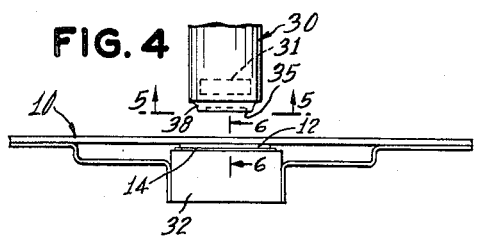
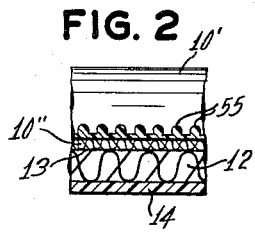
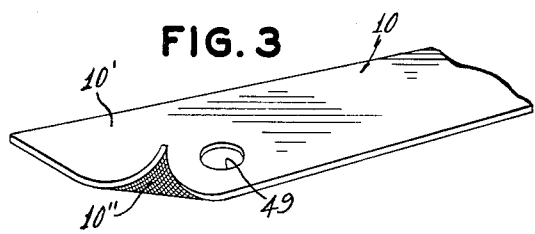
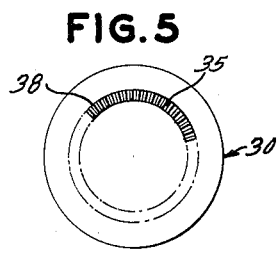
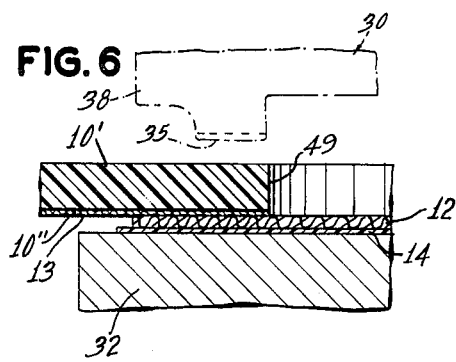
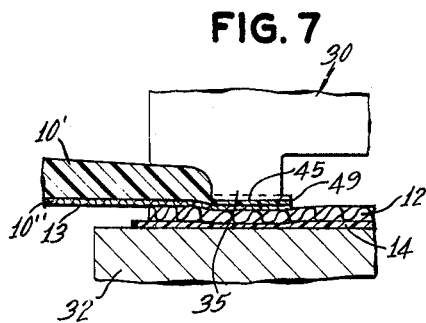
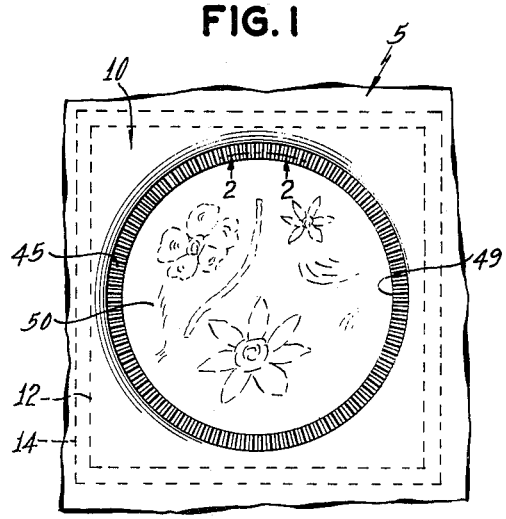
INVENTOR.
GEORGE MARKUS
BY *Harry Cohn*
ATTORNEY United States Patent Office 3,244,578
Patented Apr. 5, 1966

3,244,578
ORNAMENTAL SHEET MATERIAL AND THE
METHOD OF ITS MANUFACTURE
George Markus, West Orange, N.J., assignor, by mesne assignments, to Evans-Aristocrat Industries, Inc., Elizabeth, N.J., a corporation of New Jersey
Filed Jan. 28, 1963, Ser. No. 254,308
8 Claims. (Cl. 161—113)

The present invention relates generally to ornamental sheet material and the method of its manufacture.

One object of the invention is the provision of ornamental sheet material of novel construction and appearance which can be made efficiently and at low cost, said ornamental sheet material being adapted to be used in a multitude of decorative and utilitarian applications, for example, the formation of wallets, handbags, cosmetic bags, etc.

Another object of the present invention is the simplification of the art of securing plastic material to decorative non-plastic material, such as ornamental textile fabrics, to form an ornamental sheet assembly. Pursuant to this object of the present invention a thermoplastic adhesive is utilized to heat seal the surfaces of a decorative non-plastic material such as fabrics to plastic sheet material which closely resembles calf skin in appearance.

Another object of the present invention is the provision of a method of securing decorative textile material to thermoplastic sheet material which has a backing of textile fabric laminated therewith, the laminated material being provided with one or more die cut openings of desired peripheral contour and the decorative material being secured to the backing and covering the opening or openings.

Yet another object to the present invention is the provision of generally improved sheet material and the method of its manufacture.

The above and other objects, features, and advantages of the present invention will be more fully understood from the following discussions when considered in connection with the accompanying illustrative drawings, which illustrate the best modes now contemplated by me for carrying out my invention.

In the drawings:

FIG. 1 is a top plan view of ornamental sheet material of the present invention;

FIG. 2 is a sectional view, on a greatly enlarged scale, taken on the line 2—2 of FIG. 1;

FIG. 3 is a fragmentary perspective view of laminated sheet material utilized for the present invention;

FIG. 4 is a side elevational view of a heat sealing apparatus showing the layer of material positioned on the bed of the heat sealing apparatus preparatory to the sealing operation;

FIG. 5 is a sectional view, on an enlarged scale, taken on the line 5—5 of FIG. 4;

FIG. 6 is a face view, on a greatly enlarged scale, taken on line 6—6 of FIG. 4; and FIG. 7 is a view similar to FIG. 6 showing the condition of the material after the heat sealing operations.

Referring to the drawings and more particularly to FIGS. 1–3 thereof, there is shown a piece of ornamental sheet material 5 comprising laminated sheet material 10 having a front layer of plastic material 10' and a back layer of fabric or other sheet material having interstices therethrough 10" laminated thereto, said fabric layer 10" being coated with a thermoplastic adhesive, indicated at 13, a layer of thermoplastic sheet material or other sheet material having interstices therethrough 14 and a layer of ornamental textile material 12 secured to and between said laminated material 10 and said plastic layer 14 and to the fabric layer 10", said laminated sheet material 10 being die cut by a suitable die, not shown, to provide an opening or aperture 49 of a desired contour.

Portions of layers 10" and 12 are secured to each other by a heat sealing operation which activates the thermoplastic adhesive coating 13, causing the flow of adhesive plastic material through the interstices of the textile layer 12 and simultaneously through the interstices of fabric layer 10", thereby securing layers 10" and 12 to each other, around peripherally extending marginal edges of said two layers around opening 49, the marginal edge portion of layer 10' being indicated at 45 in FIG. 1. In the preferred embodiment of the invention of the thermoplastic layer 14 is added to securely seal said textile layer around said peripheral marginal edge, but it is within the scope of the invention to omit layer 14. When the layer 14 of thermoplastic sheet material is employed, the layer 14 and the coating 13 are heat sealed or fused to each other and the layer 12 of the ornamental textile material is secured in position by the fusion of the layer 12 to coating 13. The securing of layers 10" and 12 by the thermoplastic adhesive 13 concomitantly defines in situ the indented marginal peripheral edge 45. Said marginal peripheral edge 45 may be of any desired contour, as will be readily apparent.

Layers 12 and 14 are approximately coextensive and are precut to size to overlie and cover opening 49, it being understood that said layers may be non-coextensive if desired but are of slightly larger area then the area encompassed within the peripherally continuous edge of the opening 49 so as to conserve material and yet not require exact registration between said layers and the opening of preselected contour during the heat sealing operation.

The opening 49 die cut in the laminated sheet material 10 is closed by layer 12 to thereby expose portion 50 of the ornamental textile layer 12 through said opening.

As described previously, the laminated sheet material 10 has an opening 49, as shown in FIG. 6, of a desired contour die cut therethrough before the heat sealing process is performed. The adhesive thermoplastic coating 13 may be applied to the layer of fabric 10" of the laminated sheet material in any one of the following ways: the thermoplastic adhesive layer may be applied on the entire surface of the layer 10", it may be applied only around the area where the opening is to be die cut before the actual die cutting operation or it may be applied to the peripheral region of the opening after the opening has been die cut through the laminated sheet material 10.

In the present embodiment, the laminated sheet material 10 is composed of a thermoplastic layer 10', for example, expanded vinyl sheet material, and fabric layer 10" may be formed of any suitable intersticed material preferably a thin jersey knit fabric. The decorative layer 12 may be formed of any suitable intersticed material such as textile fabric, and the layer 14 may be any suitable heat sealable material, for example, vinyl sheet material. The coating 13 may be any thermoplastic adhesive such as a water dispersion of a blend of vinyl acetate polymers and copolymers. It is to be observed that the interstices of the textile material and the jersey knit material provide for the flow of the heated plastic material therethrough whereby to provide for the fusion of the thermoplastic layers and the adherence of the fabric layers disposed in contiguous relation therewith, as described above. Accordingly, while textile material is used for the layer 12 and jersey knit material is used for layer 10" of the instant embodiment, it will be apparent that the present invention may be practiced by utilizing any suitable intersticed material or any non-intersticed material may be utilized after being treated to provide such material with interstices for the flow of plastic material therethrough. It will also be observed that the textile layer 12 and the jersey knit layer 10″ will have thermoplastic material impregnated in the interstices thereof co-extensively with the peripheral marginal edge 45 of layer 10′.

The apparatus shown in FIGS. 4 and 5, utilized for the practice of the present invention, may be any conventional electronic heat sealing apparatus. The head assembly 30 is vertically reciprocable in relation to the bed 32. Mounted on the lower end of the head assembly 30 is a die 38 which has a peripherally continuous raised face portion 35 of preselected decorative outline. The raised face portion 35 of the die 38 of the illustrated embodiment is adapted to form the ornament sheet indented edge portion 45 illustrated in FIG. 1, the face portion 35 being of an outline corresponding to the peripheral marginal edge 45 of layer 10′ surrounding the ornamental segment 50 of the ornamental sheet assembly 5. As will be apparent from the description which follows, the raised face portion 35 may have any desired outline or contour corresponding to the contour of the die cut opening 49 of the laminated sheet 10, shown in FIG. 3. In the illustrative embodiment the face portion 35 of the die 38 is provided with a circular face corresponding to the circular marginal edge 45 of the ornamental sheet assembly 5, said circular face 35 having serrations thereon, wherein during the heat sealing operation the circular marginal edge 45 is indented and embossed as shown in FIGS. 2 and 7 and indicated at 55 in FIG. 2. It is to be observed that any desired decorative ornamentation can be formed on the circular marginal edge 45 and that the embossed ornamentation is shown merely for purposes of illustration. The face portion 35 of the die 38 is adapted to heat seal or fuse the layers of thermoplastic material to each other and cause the fabric materials to adhere to each other, as will be readily understood, there being provided conventional electronic equipment including a source of high frequency connected to assembly 30 as indicated at 31 and to bed 32 to effect an electronic heat seal of the aforementioned layers. See for example, the U.S. patent to Gannon et al., No. 2,631,646. Accordingly, the conventional electronic heat sealing equipment is adapted to act through the circular face edge 35 of the die 38 and bed 32 to effect an electronic heat sealing operation between the superposed layers of thermoplastic material and adherence of the fabric layers to each other.

In the practice of the present invention for forming the ornamental sheet assembly 5, the laminated sheet material 10 and the layers 12 and 14 are superposed on each other in that order. This superposed layer assembly is disposed on the bed 32 of the heat sealing apparatus. In the practice of the present method the registry between the superposed layers is not critical, it being only necessary to provide for registry of the peripheral marginal edge around opening 49 with heat sealing face 35. To effect a fusion or heat seal between the thermoplastic layers and to secure the textile layer 12 between adjacent thermoplastic layers 13 and 14, and to knit layer 10″, the head assembly 30 is moved downwardly to press the die face 35 against the marginal edge portion of layer 10′ around opening 49 as illustrated by FIG. 7. The die face 35 is effective to simultaneously heat seal the plastic layers to each other and secure the fabric layers to each other along the peripherally continuous marginal edges around opening 49. Upon the activation of the electronic equipment the peripheral edges of the die face 35 in conjunction with bed 32 will result in the heating of the thermoplastic layers to cause a fusion thereof along the peripheral marginal edges, this operation effecting the flow of plastic material through the interstices of the textile material 12 to effect a fusion thereof to the fabric backing 10″. The pressure of the head assembly 30 on the layer 10′ simultaneously with the heat sealing operation causes the peripheral marginal edge 45 to be indented with respect to the layer 10′ and as described previously the peripheral marginal edge 45 is embossed simultaneously therewith.

The ornamental sheet material described above may be utilized in any desired application, for example, in the formation of wallets, handbags, etc. The layers of material described above of the ornamental sheet assembly may be plain or ornamented, and may be colored or surface ornamented in any desirable manner whereby it will be apparent that a practically limitless number of effects may be achieved. It is apparent from the above discussion that the outline or peripheral contour illustrated and described above are given by way of example only and that any desired outline of the ornamental material may be provided, the die face of the die being shaped to provide the desired outline.

The ornamental sheet material of the present invention may be used for the purposes referred to in U.S. Patents Nos. 2,710,046, 2,729,010, and 2,729,009, issued to the assignee of my present application.

While I have shown and described the preferred embodiment of my invention it will be understood that various changes may be made without departing from the underlying idea or principles of the invention within the scope of the appended claims.

What I claim is:

1. Ornamental laminar material, comprising: an uppermost layer of plastic sheet material; an intermediate layer of sheet material having interstices therethrough laminated to the underside of said uppermost layer; a thermoplastic adhesive layer applied to the underside of said intermediate layer; said uppermost, intermediate and adhesive layers having an aperture therethrough; a lowermost ornamental layer of sheet material having interstices therethrough applied to the underside of said thermoplastic layer and closing said aperture; said adhesive being disposed in part in said interstices of said intermediate layer and in part in said interstices of said lowermost layer, thereby joining said layers together.

2. Ornamental laminar material, comprising: an uppermost layer of plastic sheet material; an intermediate layer of sheet material having interstices therethrough laminated to the underside of said uppermost layer; a thermoplastic adhesive layer applied to the underside of said intermediate layer; said uppermost, intermediate and adhesive layers having an aperture therethrough; an additional intermediate ornamental layer of sheet material having interstices therethrough applied to the underside of said thermoplastic adhesive layer and closing said aperture; a lowermost layer of plastic sheet material applied to the underside of said additional intermediate layer; said adhesive layer being disposed in part in said interstices of said intermediate layer and in part through said interstices of said additional intermediate layer, thereby joining said intermediate, additional intermediate and lowermost layers together.

3. Ornamental laminar material, comprising: an uppermost layer of plastic sheet material; an intermediate layer of sheet material having interstices therethrough laminated to the underside of said uppermost layer; a thermoplastic adhesive layer applied to the underside of said intermediate layer; said uppermost, intermediate and adhesive layers having an aperture therethrough; a lowermost ornamental layer of sheet material having interstices therethrough applied to the underside of said thermoplastic adhesive layer and closing said aperture; said adhesive layer being disposed in part in said interstices of said intermediate layer and in part in said interstices of said lowermost layer, thereby joining said layers together; said uppermost layer having an indented and heat sealed margin encircling said aperture and defining the upper visible boundary of said lowermost layer through said aperture.

4. Ornamental laminar material, comprising: an uppermost layer of plastic sheet material; an intermediate layer of sheet material having interstices therethrough laminated to the underside of said uppermost layer; a thermoplastic adhesive layer applied to the underside of said intermediate layer; said uppermost, intermediate and adhesive layers having a die-cut aperture therethrough; an additional intermediate ornamental layer of sheet material having interstices therethrough applied to the underside of said thermoplastic adhesive layer and closing said aperture; a lowermost layer of plastic sheet material applied to the underside of said additional intermediate layer; said adhesive layer being disposed in part in said interstices of said intermediate layer and in part through said interstices of said additional intermediate layer, thereby joining said intermediate, additional intermediate and lowermost layers together; said uppermost layer having an indented and heat sealed margin encircling said aperture and defining the upper visible boundary of said additional intermediate layer through said aperture.

5. A method of providing an ornamental assembly of sheet material, comprising: applying a thermoplastic adhesive to the undermost surface of a laminar sheet material formed of an upper layer of plastic sheet material and a lower layer of sheet material having interstices therethrough; die-cutting said laminar sheet material to provide an aperture therethrough having a desired contour; applying an ornamental layer of sheet material having interstices therethrough under said aperture in overlapping relation to said lower layer in the region of said applied adhesive with a portion of said ornamental layer extending completely around a marginal edge portion of said laminar sheet material around said aperture; and heat sealing said portion of said ornamental layer to said lower layer around said aperture.

6. A method of providing an ornamental assembly of sheet material, comprising: applying a thermoplastic adhesive to the undermost surface of a laminar sheet material formed of an upper layer of plastic sheet material and a lower layer of sheet material having interstices therethrough; die-cutting said laminar sheet material to provide an aperture therethrough having a desired contour; applying an ornamental layer of sheet material having interstices therethrough under said aperture in overlapping relation to said lower layer in the region of said applied adhesive with a portion of said ornamental layer extending completely around a marginal edge portion of said laminar sheet material around said aperture; applying an additional layer of plastic sheet material to the undersurface of said ornamental layer; and heat sealing said portion of said ornamental layer, said laminar sheet material and said additional layer around said aperture together.

7. A method of providing an ornamental assembly of sheet material, comprising: applying a thermoplastic adhesive to the undermost surface of a laminar sheet material formed of an upper layer of thermoplastic sheet material and a lower layer of sheet material having interstices therethrough; die-cutting said laminar sheet material to provide an aperture therethrough having a desired contour; applying an ornamental layer of sheet material having interstices therethrough under said aperture in overlapping relation to said lower layer in the region of said applied adhesive with a portion of said ornamental layer extending completely around a marginal edge portion of said laminar sheet material around said aperture; and applying heat and pressure to the uppermost surface of said laminar sheet material at a marginal edge portion thereof around said aperture, thereby indenting said marginal edge portion of said thermoplastic sheet material and heat sealing said ornamental layer to said laminated sheet material.

8. A method of providing an ornamental assembly of sheet material, comprising: applying a thermoplastic adhesive to the undermost surface of a laminar sheet material formed of an upper layer of plastic sheet material and a lower layer of sheet material having interstices therethrough; die-cutting said laminar sheet material to provide an aperture therethrough having a desired contour; applying an ornamental layer of sheet material having interstices therethrough under said aperture in overlapping relation to said lower layer in the region of said applied adhesive with a portion of said ornamental layer extending completely around a marginal edge portion of said laminar sheet material around said aperture; applying an additional layer of plastic sheet material to the undersurface of said ornamental layer; and applying heat and pressure to the uppermost surface of said laminar sheet material at a marginal edge portion thereof around said aperture, thereby indenting said marginal edge portion of said first plastic sheet material and heat sealing said indented marginal edge portion of said first plastic sheet material, said ornamental layer and said additional layer around said aperture together.

References Cited by the Examiner

UNITED STATES PATENTS

| | | | |
|---|---|---|---|
| 1,113,030 | 10/1914 | McLaurin | 156—98 |
| 1,909,841 | 5/1933 | Perryman | 156—261 |
| 1,995,077 | 3/1935 | Perryman | 156—261 |
| 2,082,346 | 6/1937 | Lavenson | 161—109 |
| 2,101,607 | 12/1937 | Block | 156—94 |
| 2,631,646 | 3/1953 | Gannon et al. | 156—518 |
| 2,710,046 | 6/1955 | Markus et al. | 156—323 |
| 2,729,009 | 1/1956 | Markus et al. | 161—39 |
| 2,729,010 | 1/1956 | Markus et al. | 161—39 |
| 2,752,276 | 6/1956 | Woock | 161—109 |
| 2,891,340 | 6/1959 | Markus et al. | 161—39 |

EARL M. BERGERT, *Primary Examiner.*

H. F. EPSTEIN, *Assistant Examiner.*